(12) United States Patent
Lopez Martinez

(10) Patent No.: US 12,377,808 B1
(45) Date of Patent: Aug. 5, 2025

(54) VEHICLE INTERIOR PANEL HAVING AN EXPANDABLE AIRBAG CHUTE

(71) Applicant: Faurecia Interior Systems, Inc., Auburn, MI (US)

(72) Inventor: Carlos Gerardo Lopez Martinez, Puebla (MX)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/917,196

(22) Filed: Oct. 16, 2024

(51) Int. Cl.
| B60R 21/205 | (2011.01) |
| B60R 21/206 | (2011.01) |
| B60R 21/2165 | (2011.01) |
| B60R 21/217 | (2011.01) |
| B60R 21/215 | (2011.01) |

(52) U.S. Cl.
CPC ......... *B60R 21/206* (2013.01); *B60R 21/205* (2013.01); *B60R 21/2165* (2013.01); *B60R 21/217* (2013.01); *B60R 2021/21537* (2013.01)

(58) Field of Classification Search
CPC . B60R 21/205; B60R 21/206; B60R 21/2165; B60R 21/2171; B60R 21/217; B60R 21/20; B60R 2021/21537
USPC .................. 280/732, 730.1, 728.2, 728.3
See application file for complete search history.

(56) References Cited

U.S. PATENT DOCUMENTS

| 5,292,151 A * | 3/1994 | Parker ................. B60R 21/2165 |
| | | 83/544 |
| 5,431,442 A * | 7/1995 | Tomita ..................... B60R 7/06 |
| | | 280/751 |
| 6,010,147 A * | 1/2000 | Brown .................. B60R 21/045 |
| | | 280/752 |
| 6,135,495 A * | 10/2000 | Redgrave .............. B60R 21/205 |
| | | 280/752 |
| 6,237,936 B1 * | 5/2001 | Quade .................. B60R 21/207 |
| | | 280/730.2 |
| 6,626,455 B2 | 9/2003 | Webber et al. |
| 7,311,327 B2 * | 12/2007 | Yamazaki ............. B60R 21/045 |
| | | 280/751 |
| 8,480,119 B2 * | 7/2013 | Haidar .................. B60R 21/217 |
| | | 280/728.1 |
| 8,544,875 B2 | 10/2013 | Heinisch |

(Continued)

FOREIGN PATENT DOCUMENTS

DE 102008051565 B4 10/2019
JP 2008055937 A * 3/2008

*Primary Examiner* — Keith J Frisby
(74) *Attorney, Agent, or Firm* — Reising Ethington P.C.

(57) ABSTRACT

A vehicle interior panel for use over an airbag and configured to split along a tear seam in an airbag door region of the panel during airbag deployment includes a chute located along a back side of the panel for guiding the airbag toward the airbag door region during airbag deployment. The chute has a wall interconnecting opposite sides of the chute, the wall being configured to split at a predetermined location such that the opposite sides of the chute move away from each other to enlarge the airbag door region during airbag deployment. The wall may have an inner portion and an outer portion. The inner portion may at least partly define an inner surface of the chute. A cavity may be defined between the inner portion and the outer portion of the wall. The inner portion of the wall may include the predetermined location.

15 Claims, 3 Drawing Sheets

(56) References Cited

U.S. PATENT DOCUMENTS

| | | | | |
|---|---|---|---|---|
| 2001/0005075 A1* | 6/2001 | Lorenz | ................ | B60R 21/217 |
| | | | | 280/728.2 |
| 2003/0184059 A1* | 10/2003 | Karlsson | ............... | B60R 21/215 |
| | | | | 280/728.3 |
| 2004/0195810 A1* | 10/2004 | Dietze | ................ | B60R 21/045 |
| | | | | 280/732 |
| 2007/0018440 A1* | 1/2007 | Reiter | ................ | B60R 21/215 |
| | | | | 280/732 |
| 2007/0090634 A1* | 4/2007 | Jang | ................ | B60R 21/217 |
| | | | | 280/730.2 |
| 2007/0235987 A1* | 10/2007 | Boggess | ............... | B60R 21/205 |
| | | | | 280/732 |
| 2009/0315305 A1* | 12/2009 | Evans | ................ | B60R 21/2165 |
| | | | | 280/730.2 |
| 2010/0237593 A1* | 9/2010 | Evans | ................ | B60R 21/2165 |
| | | | | 280/728.3 |
| 2017/0129443 A1* | 5/2017 | Elija | ................ | B60R 21/215 |
| 2021/0162944 A1* | 6/2021 | Hioda | ................ | B60R 21/2165 |
| 2021/0300288 A1* | 9/2021 | Ono | ................ | B60R 21/207 |

* cited by examiner

VEHICLE INTERIOR PANEL HAVING AN
EXPANDABLE AIRBAG CHUTE

TECHNICAL FIELD

The present disclosure is related generally to vehicle interior panels and, more particularly, to vehicle interior panels through which an airbag can deploy.

BACKGROUND

Airbags are commonly employed safety devices in vehicle interiors and are often hidden beneath decorative panels until they need to be deployed. Such panels may be configured to split under the force of a deploying airbag to allow the airbag into the passenger cabin to protect occupants in the event of a collision. In one example, U.S. Pat. No. 6,626,455 discloses an air bag module for use in an instrument panel. The air bag module has a deformable housing with a neck portion defining an opening. The module is coupled with the instrument panel on opposite sides of the opening and on opposite sides of a tear seam in the instrument panel. Airbag deployment causes deformation of the housing, which helps split the instrument panel at the tear seam.

SUMMARY

Embodiments of a vehicle interior panel for use over an airbag are configured to split along a tear seam in an airbag door region of the panel during airbag deployment. The panel includes a chute located along a back side of the panel for guiding the airbag toward the airbag door region during airbag deployment. The chute has a wall configured to split at a predetermined location such that the opposite sides of the chute move away from each other to enlarge the airbag door region during airbag deployment.

In various embodiments, the chute includes a body. The wall extends away from a back side of the body and surrounds the airbag door region.

In various embodiments, the wall meets the body at the predetermined location.

In various embodiments, the wall surrounds the airbag door region. The wall includes opposite wall segments on the opposite sides of the chute and an additional wall segment interconnecting the opposite wall segments. The additional wall segment is longer than the opposite wall segments.

In various embodiments, the predetermined location is a reduced-thickness region of the wall.

In various embodiments, the reduced-thickness region has a thickness that is 10-40% of a thickness of the wall outside the reduced-thickness region.

In various embodiments, the vehicle interior panel includes a chute tear seam along the wall at the predetermined location.

In various embodiments, the wall has an inner portion and an outer portion. The inner portion at least partly defines an inner surface of the chute. A cavity is defined between the inner portion and the outer portion of the wall, and the predetermined location is along the inner portion of the wall.

In various embodiments, the outer portion of the wall intersects the inner portion of the wall at first and second locations on opposite sides of the predetermined location such that the first and second locations move away from each other during airbag deployment.

In various embodiments, the outer portion of the wall is curved between the first and second locations at a first end of the cavity. The outer wall is tapered toward an opposite second end of the cavity.

In various embodiments, the outer wall has a thickness that is greater at the first end of the cavity than at the second end of the cavity.

In various embodiments, the first end of the cavity is an open end. The second end of the cavity is a closed end.

In various embodiments, the tear seam is an H-shaped tear seam. The panel includes two airbag doors having hinge sides on the opposite sides of the chute.

In various embodiments, the opposite sides of the chute pivot away from each other to enlarge the airbag door region during airbag deployment.

In various embodiments, the vehicle interior panel is an instrument panel.

It is intended that any one or more of the above-listed features, along with any of the features in the figures and in the following description, can be combined in any technically feasible combination to define a claimed invention, except where features are mutually exclusive.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE
EMBODIMENTS

Described herein is a vehicle interior panel for use over an airbag. The panel includes a chute wall configured to split at a predetermined location such that opposite sides of the chute move away from each other to enlarge an airbag door region of the panel and the associated deployment opening formed through the panel during airbag deployment. While conventional airbag chutes are designed to stay intact to guide the airbag toward the vehicle interior during its initial moments of deployment, controlled splitting of the chute wall has now been found to offer certain advantages, such as compatibility with higher-energy and earlier-inflating airbags.

Figure 1:
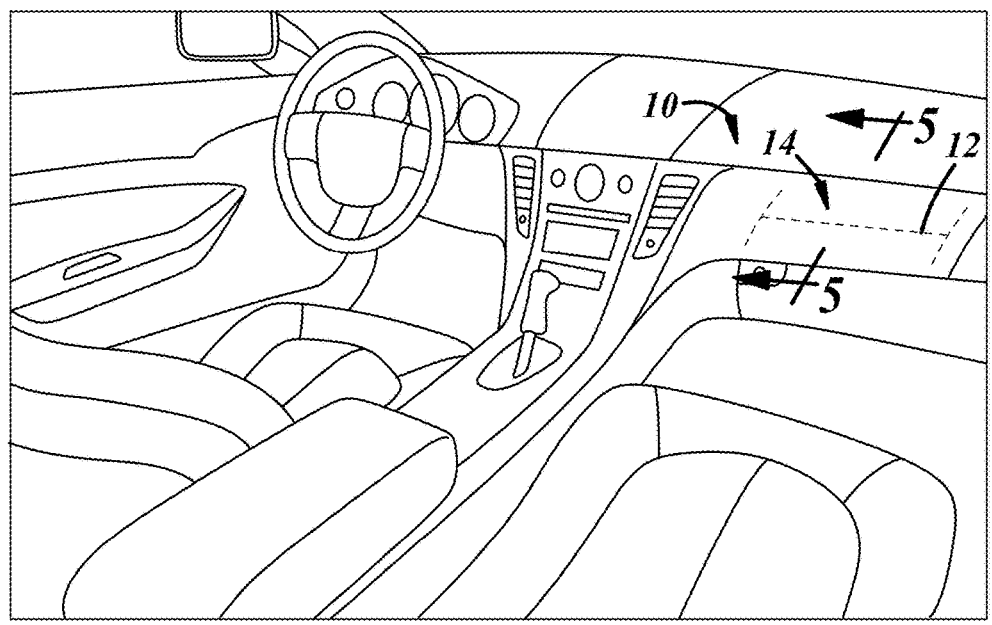
FIG. 1 is a perspective view of a vehicle interior illustrating an example of a vehicle interior panel.

FIG. 1 is a perspective view of a vehicle interior showing an example of a vehicle interior panel 10 for use over a deployable airbag. The illustrated panel 10 is a vehicle instrument panel configured to split along an H-shaped tear seam 12 on a passenger side of the vehicle, but the following description is applicable to any vehicle interior panel, such as that of a vehicle door, steering wheel, console, roof, pillar, seat, etc. The panel 10 may be a multilayered panel including a rigid or semi-rigid substrate (e.g., reinforced plastic) and a decorative covering disposed over the substrate. The decorative covering may include multiple layers, such as a decorative skin layer (e.g., simulated leather) forming a visible outer surface and one or more intermediate layers (e.g., foam or 3D-fabric) to provide additional thickness to the covering.

The tear seam 12 is an intentionally weakened line or pattern of lines formed in the panel 10 so that, when the underlying airbag inflates, the inflation forces cause the panel 10 to split in a controlled manner and at a known location to form an airbag deployment opening through the panel. The tear seam 12 may be formed in or have portions in any number of layers of the panel 10 and is located in an airbag door region 14 of the panel. The tear seam 12 may also at least partially define the airbag door region 14. In the illustrated example, the airbag door region 14 is a generally rectangular area of the panel having its four corners at the four free ends of the H-shape of the tear seam 12. The airbag door region 14 is a projected area of the panel 10 such that it is present in and part of each of the individual layers of the panel 10.

Figure 2:
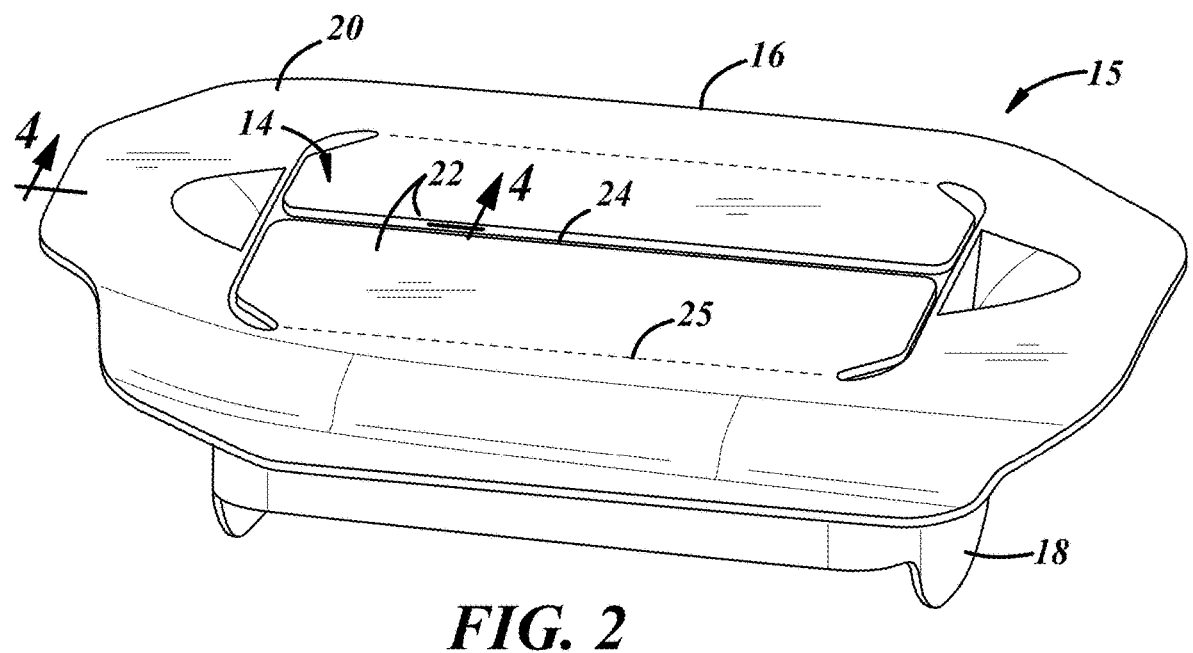
FIG. 2 is a perspective view of an airbag chute of the vehicle interior panel of FIG. 1.

FIG. 2 is a perspective view of a chute 15 of the panel 10 of FIG. 1. The chute 15 includes a body 16 and a chute wall 18 extending away from the body. The body 16 functions as an interface with the substrate of the panel 10, and the chute wall 18 functions to constrain and guide the deploying airbag toward the airbag door region 14 of the panel. While not shown here, the chute wall 18 may be configured for attachment of an airbag canister and/or the chute 15 may include an airbag canister attached to the chute wall 18. The body 16 may be attached or configured for attachment to the back side of a substrate of the panel 10 with the airbag door region 14 of the chute 15 aligned with the tear seam 12 of the panel. In this case, the body 16 includes a substantially rectangular frame 20 surrounding the airbag door region 14 and two airbag doors 22. Each airbag door 22 is defined in part by an opening 24 formed through the body 16. The opening 24 has the same general shape as the tear seam 12 and provides a gap between the frame 20 and edges of the airbag doors 22. A hinge side 25 of each airbag door 22 is attached to the surrounding frame 20 such that the doors pivot open away from each other during airbag deployment. In other embodiments, the panel 10 or chute 15 has a single airbag door 22 and a corresponding U-shaped tear seam 12. Other numbers of doors 22 and tear seam shapes are possible, such as an X-shaped tear seam with four airbag doors or a Y-shaped tear seam with three airbag doors. As used here, a "door" includes any covering or portion of a covering over a deployable airbag that is configured to change position upon deployment of the airbag to reveal a deployment opening in the panel 10, including, for example, a portion of the panel 10 or chute 15 that completely separates from the body 16 or panel substrate during airbag deployment.

In some embodiments, the chute 15 is a drop-in chute with a back side of the body 16 attached to the front side of the substrate of the panel 10 and the chute wall 18 extending through an opening in the panel substrate. In other embodiments, the chute wall 18 is molded as one-piece with the substrate of the panel 10 such that the panel substrate functions as the illustrated body 16 and the chute 15 and chute wall 18 are one and the same. In all of these cases, the chute wall 18 is located along a back side of the vehicle interior panel 10, which is the side of the panel facing away from the vehicle interior.

Figure 3:
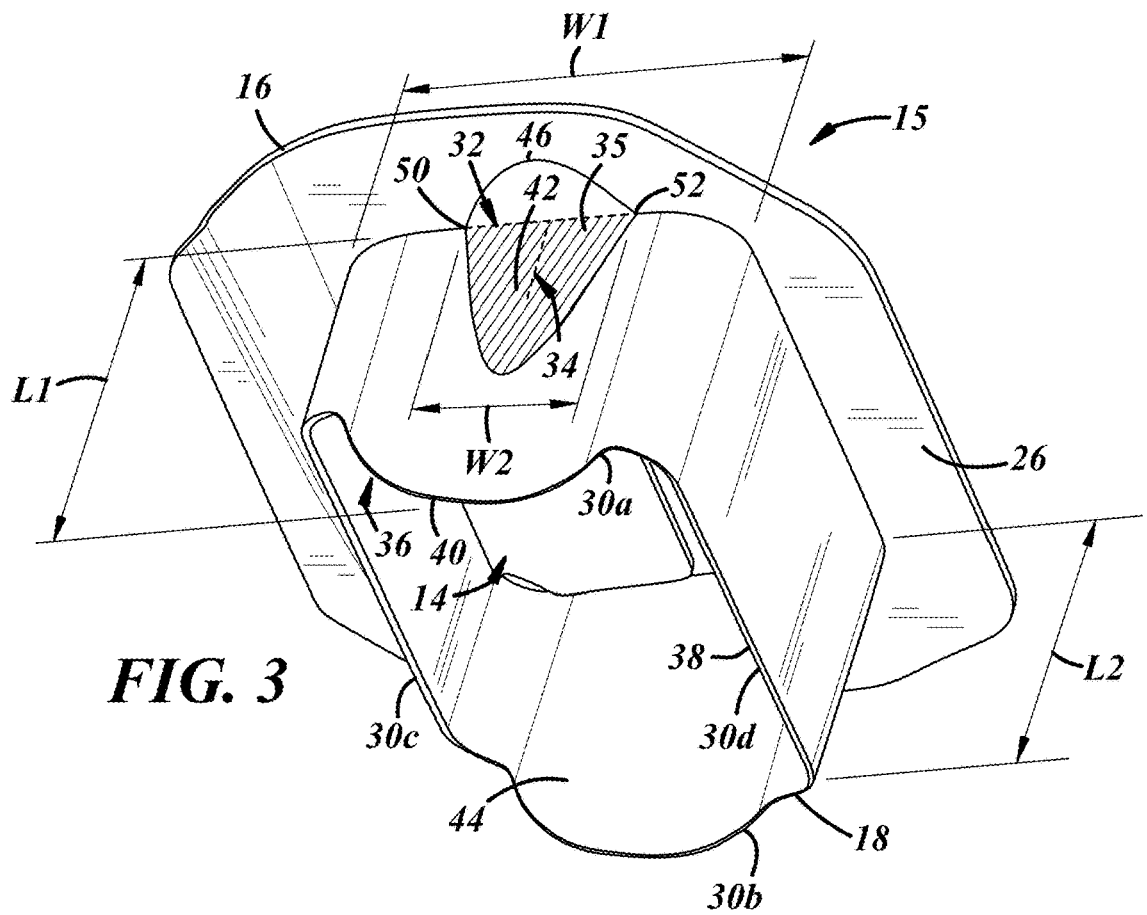
FIG. 3 is a bottom view of the airbag chute of FIG. 2.

FIG. 3 is a bottom perspective view of the chute 15 of FIG. 2. The illustrated chute wall 18 extends from a back side 26 of the body 16, which is the side of the body facing away from the vehicle interior when installed in the vehicle. The chute wall 18 may be arranged along at least a portion of the perimeter of the airbag door region 14 and may surround the airbag door region. In this case, the chute wall 18 is a continuous wall 18 completely surrounding the airbag door region 14 and has four discernable wall segments 30a-30d that form a substantially rectangular shape with rounded corners. The chute wall 18 may have a greater or lesser number of segments and the chute wall 18 can have any shape, including shapes without discernible corners (e.g., elliptical).

The chute wall 18 is configured to split at a predetermined location 32 such that opposite sides of the chute 15 move away from each other to enlarge the airbag door region 14 during airbag deployment. In this case, the predetermined location 32 is within a region 35 of the chute wall 18 adjacent to the body 16 (the shaded area of FIG. 3)—i.e., the chute wall 18 meets the body 16 at the predetermined location 32. The region 35 is located along one of the wall segments 30a of the chute wall 18 that interconnects the wall segments 30c, 30d on the opposite sides of the chute 15 that move away from each other during airbag deployment when the wall 18 splits. Both of the wall segments 30a, 30b interconnecting the opposite sides 30c, 30d of the chute wall 18 may include a predetermined location 32 at which the chute wall 18 is configured to split during airbag deployment. In this example, the two wall segments 30a, 30b may be referred to as side wall segments that interconnect the rearward wall segment 30c with the forward wall segment 30d.

The predetermined location 32 may be a specific point on the chute wall 18, a tear seam 34 along the chute wall, and/or may be a defined region of the chute wall, such as region 35. For example, the predetermined location 32 may be or may include a reduced-thickness region 35 of the chute wall 18 that is thinner than adjacent regions of the same wall or wall segment 30a, 30b so that the wall splits at the predetermined location before the adjacent regions of the chute wall 18 during airbag deployment. In other words, the reduced-thickness region 35 acts as a stress concentrator such that airbag expansion forces are disproportionately concentrated there. In the illustrated example, region 35 is a reduced-thickness region. In some embodiments, the predetermined location 32 is defined by a tear seam 34 and/or a different type of stress concentrator (e.g., a notch) located in a reduced-thickness region. As with the tear seam 12 of the panel 10, the chute tear seam 34 is an intentionally weakened line or pattern of lines formed in the chute wall 18 so that airbag inflation forces cause the chute wall to split in a controlled manner and at a predictable location.

The reduced-thickness region 35 may be located along one or more segments of the chute wall 18, such as segments 30a and 30b, and at the intersection of the respective wall segment with the body 16 of the chute 15. The reduced-thickness region 35 is part of the wall segment 30a, 30b in which it is formed and may be less than half the area of that wall segment. As shown in FIG. 3, the respective wall segment 30a, 30b may have a length L1 measured in a direction extending away from the back side 26 of the body 16, and the reduced-thickness region 35 may have a length in the same direction that is less than half the length L1. As shown in FIG. 3, the chute wall 18 may have a width W1 between the wall segments 30c, 30d and the opposite sides of the chute wall 18, and the reduced-thickness region 35 may have a width W2 in the same direction that is less than half the width W1. As shown in FIG. 3, the reduced-thickness region 35 may be located along a central portion of the respective wall segment 30a, 30b—i.e., spaced away from the opposite sides 30c, 30d of the chute wall 18.

The opposite wall segments 30c, 30d on the opposite sides of the chute 15 that move away from each other during airbag deployment have a length L2 that is less than the length L1 of the wall segments 30a, 30b interconnecting the opposite sides of the chute. In other words, the wall segment 30a, 30b that includes the predetermined location 32 extends farther away from the body 16 of the chute 15 than the wall segments 30c, 30d on the opposite sides of the chute. This provides the interconnecting wall segments 30a, 30b, which split at the predetermined location 32 during airbag deployment, with additional structure and strength to ensure that the wall segment splits along only a portion of its length L1. In the illustrated example, the bottom side 36 of the chute wall 18 has a curved region 40. The curved region 40 may extend the entire width W1 of the chute wall 18. The curved region 40 may comprise a middle section of the width W1 of the chute wall 18 such that the curved region 40 does not include portions of the chute wall 18 that abut either opposite side 30c, 30d of the chute wall 18.

Figure 4:
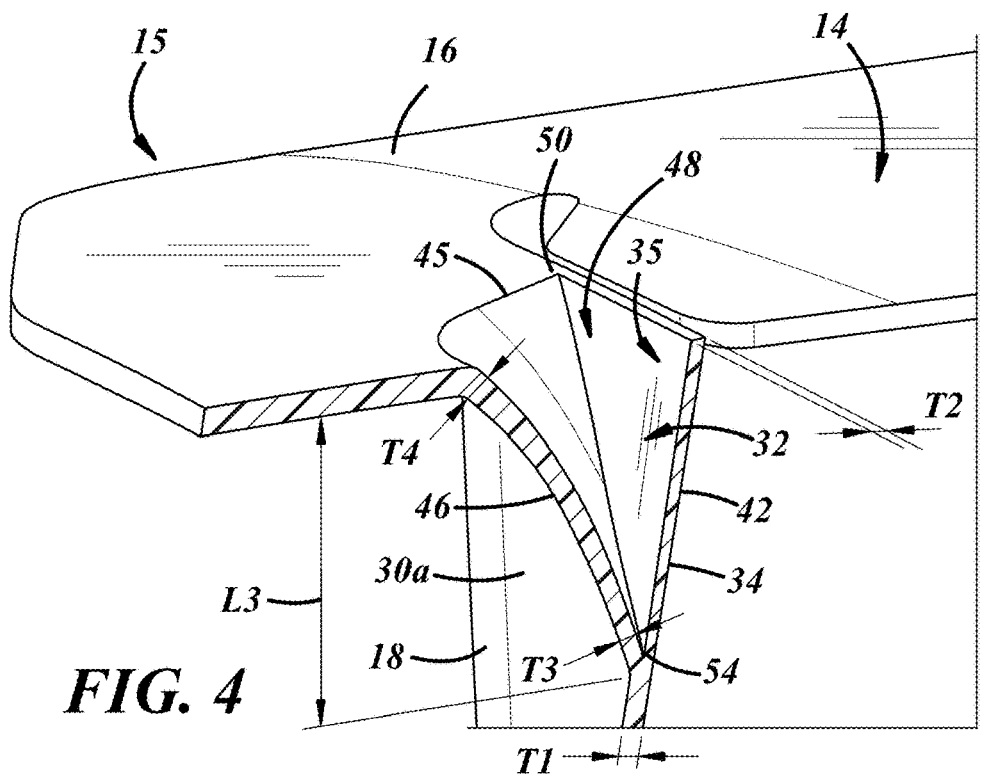
FIG. 4 is a partial cross-sectional view of the airbag chute of FIGS. 2 and 3.

FIG. 4 is a cross-sectional view of the chute 15 of FIGS. 2 and 3 including the reduced-thickness region 35 of FIG. 3. The wall segment 30a including the reduced-thickness region 35 may have a first wall thickness T1 outside the reduced-thickness region 35 and a second wall thickness T2 within the reduced-thickness region, where T2 is less than T1. The second thickness T2 may be between 0.1 mm and 2.0 mm or between 0.7 mm and 1.1 mm. The first thickness T1 may be between 2.0 mm and 4.0 mm or between 3.0 mm and 3.5 mm. In some embodiments, the second thickness T2 may be in a range from 10% to 40% of the first thickness T1. For example, the first thickness T1 may be 3.0 mm and the second thickness T2 may be 10% of the first thickness T1, or 0.3 mm. In another example, the first thickness T1 may be 3.0 mm and the second thickness T2 may be 40% of the first thickness T1, or 1.2 mm. In some embodiments, the second thickness T2 may be 20-35% of the first thickness T1. For example, the first thickness T1 may be 3.5 mm and the second thickness T2 may be 20% of the first thickness T1, or 0.7 mm. In another example, the first thickness T1 may be 3.0 mm and the second thickness T2 may be 35% of the first thickness T1, or about 1.1 mm.

As shown in FIG. 4, the chute wall 18 may have a dual-wall construction at the predetermined location 32 including an inner portion 42, which defines part of an inner surface 44 of the chute wall 18, and an outer portion 46 spaced from the inner portion and outside of the airbag door region 14. The inner portion 42 of the chute wall 18 includes the predetermined location 32. A cavity 48 is formed between the inner and outer portions 42, 46 of the chute wall 18. The cavity 48 has a first end 45 at the body 16 of the chute 15 and a second end 54 spaced away from the body by a distance L3. The outer portion 46 of the chute wall 18 is curved between first and second locations 50, 52 (FIG. 3) at a first end 45 of the cavity 48, and the outer portion 46 is tapered toward an opposite second end 54 of the cavity, which is spaced from the body 16 of the chute 15 by a distance L3. In this example, the first end 45 of the cavity 48 is an open end, and the second end 54 is a closed end.

As shown in the FIG. 3, the outer portion 46 of the chute wall 18 may intersect the inner portion 42 of the chute wall 18 at the first location 50 and the second location 52 on opposite sides of the predetermined location 32 such that the first and second locations 50, 52 also move away from each other during airbag deployment while the opposite sides 30c, 30d of the chute 15 and chute wall 18 move away from each other when the wall 18 splits at the predetermined location 32. The outer portion 46 of the chute wall 18 is intended to limit how far along the wall segment length L1 the wall 18 is permitted to split and/or to limit how far the opposite sides 30c, 30d of the chute wall 18 can move away from each other.

The outer portion 46 of the chute wall 18 may be substantially U-shaped. In this example, the outer portion 46 has a substantially U-shaped cross-section in two directions. Cross-sections of the outer portion 46 taken parallel with the body 16 of the chute 15 are substantially U-shaped, and cross-sections of the outer portion 46 taken parallel with the inner portion 42 and the remainder of the wall segment 30a are also substantially U-shaped. This is only one example of a shape of the outer portion 46 of the dual-construction of the chute wall 18. While curved shapes may be preferred to limit stress concentration in the outer portion 46 of the chute wall 18, the outer portion 46 may have straight portions while still tying the wall together at locations 50, 52 on opposite sides of the predetermined location 32 to limit how far from the body 16 the wall 18 will split. In some cases, the cavity 48 does not have a closed end 54.

When the dual-walled construction is employed, the outer portion 46 of the chute wall 18 may have an increased thickness T4 at the open end 45 of the cavity 48 relative to the thickness T3 elsewhere along its length, such as at the closed end 54. This additional structure at the open end 45 of the cavity 48 can provide additional strength resistance to bending of the outer portion 46 of the chute wall 18 as the outer portion 46 tends to straighten as the opposite sides 30c, 30d of the chute wall 18 move apart and the intersection points 50, 52 of the outer portion 46 with the inner portion 42 move apart. The wall thickness T4 of the outer portion 46 at the open end 45 of the cavity 48 may for example be 40% to 70% greater than the thickness T3 at the opposite end 54.

Embodiments of the panel 10 include any combination of these features: a reduced-thickness region 35 of the chute wall 18, a tear seam 34 or other stress concentrator formed in the chute wall, and an outer portion 46 of the chute wall that intersects an inner portion 42 of the chute wall on opposite sides of the predetermined location 32. The panel 10 may include the reduced-thickness region 35 alone to cause the chute wall 18 to split in that region without any additional stress concentrator and without the reinforcement of the outer portion 46 of the wall. The result is an airbag door region 14 that is enlarged during airbag deployment, even if the splitting is not along a tear seam and even if no outer wall portion 46 is present. The panel 10 may include the tear seam 34 alone to cause the chute wall 18 to split along a line of the wall even if the tear seam 34 is not in a reduced thickness region of the wall and whether or not outer wall portion 46 is present.

Configuring the chute wall 18 to split at where it meets the body 16 of the chute 15 or substrate of the panel 10 may result in a pivoting motion of the opposite sides of the chute when they move away from each other during airbag deployment. In other words, the chute wall 18 expands at its proximal end while its distal end generally retains its initial shape and size, or at least expands less than the proximal end. A schematic representation of this pivoting motion is illustrated in the cross-sectional views of FIGS. 5-7.

Figure 5:
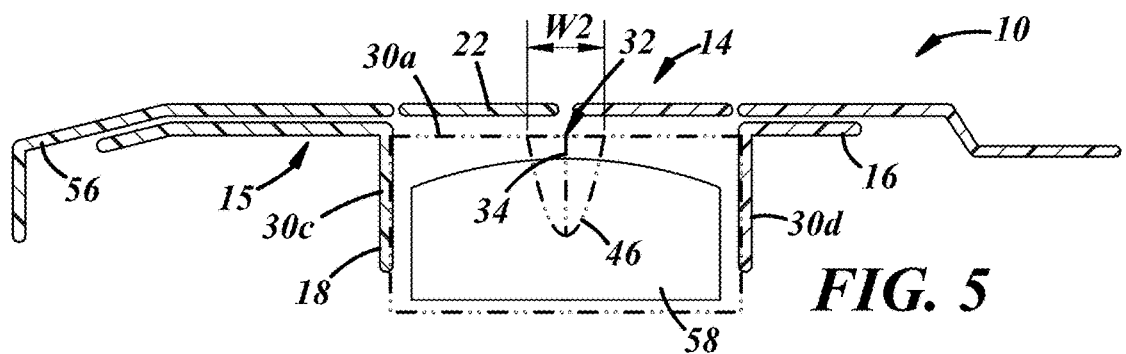
FIG. 5 is a schematic cross-sectional view of the vehicle interior panel of FIG. 1 before airbag deployment.

FIG. 5 illustrates an airbag 58 in the chute wall 18 before deployment or in the initial stage of inflation. In this example, the panel 10 includes a chute 15 attached to the back side of a panel substrate 56, and the panel substrate includes the airbag doors 22 in the airbag door region 14. The cross-section is taken through the wall segments 30c, 30d, which are on the opposite sides of the chute 15 that move away from each other during airbag deployment. The wall segments 30a, 30b along which the chute wall 18 is configured to split are out of plane in FIGS. 5-7, but one of the wall segments 30a is shown in phantom lines for purposes of explanation. The predetermined location 32 in this case is at a tear seam 34 in the wall segment 30a where the chute wall 18 meets the body 16. The wall segment 30a has a dual-wall construction at the predetermined location 32 consistent with the above description. The tear seam 34 is formed in an inner portion of the wall segment 30a, and that inner portion may have a reduced-thickness region across from the outer portion 46.

Figure 6:
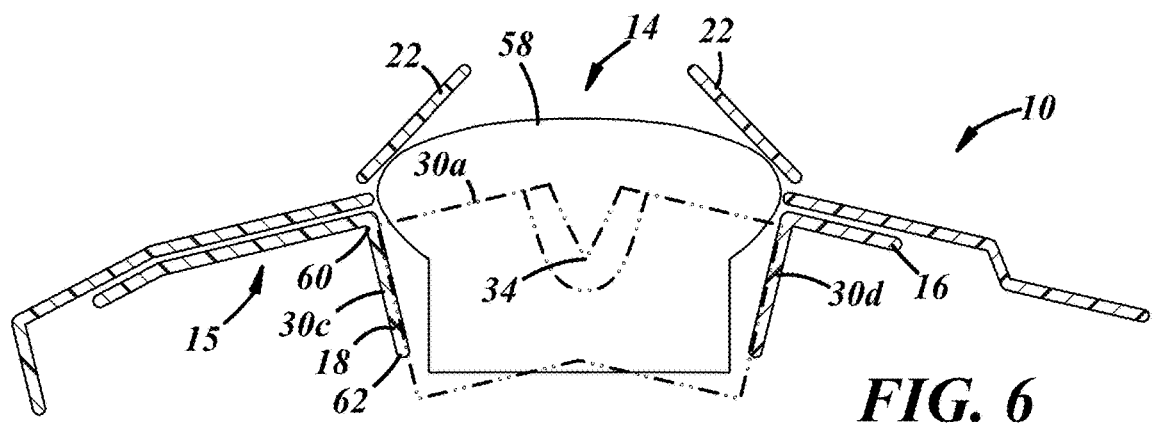
FIG. 6 is the cross-sectional view of FIG. 5 illustrating the panel during airbag during deployment.

FIG. 6 illustrates the partially inflated airbag 58 as it is emerging from the panel 10. At this point, airbag inflation forces have split the panel 10 along its tear seam 12 (FIG. 1) and the airbag doors 22 are partially open. Additionally, a portion of the airbag 58 still in the chute wall 18 is expanded and has applied forces to the inner surfaces of the chute wall 18 tending to expand or stretch the chute wall 18 outward. With conventional airbag chute construction, this situation can cause the chute wall 18 and/or portions of the panel 10 outside the airbag door region 14 to break in an uncontrolled manner, possibly causing pieces of the panel to break off, for example. This can also unduly restrict further airbag inflation. In the example of FIG. 6, however, the wall segment 30a interconnecting the wall segments 30c, 30d on opposite sides of the chute wall 18 splits along the tear seam 34 (and/or along a similarly positioned reduced-thickness portion) to permit the opposite sides of the chute 15 to move away from each other, effectively enlarging the airbag door region 14 and the resulting deployment opening. The chute wall 18 is thus made to split in a controlled manner resulting in the above-described pivoting or tilting motion of the opposite sides of the chute 15 rather than uncontrolled breakage of the panel 10 outside the airbag door region 14. The pivoting motion involves proximal ends 60 of the wall segments 30c, 30d moved apart further than their distal ends 62. It is noted that a pure pivoting motion is not required—i.e., the opposite sides of the chute 15 may pivot about pivot axes that are also moving or changing, and some of the movement may be translational.

Figure 7:
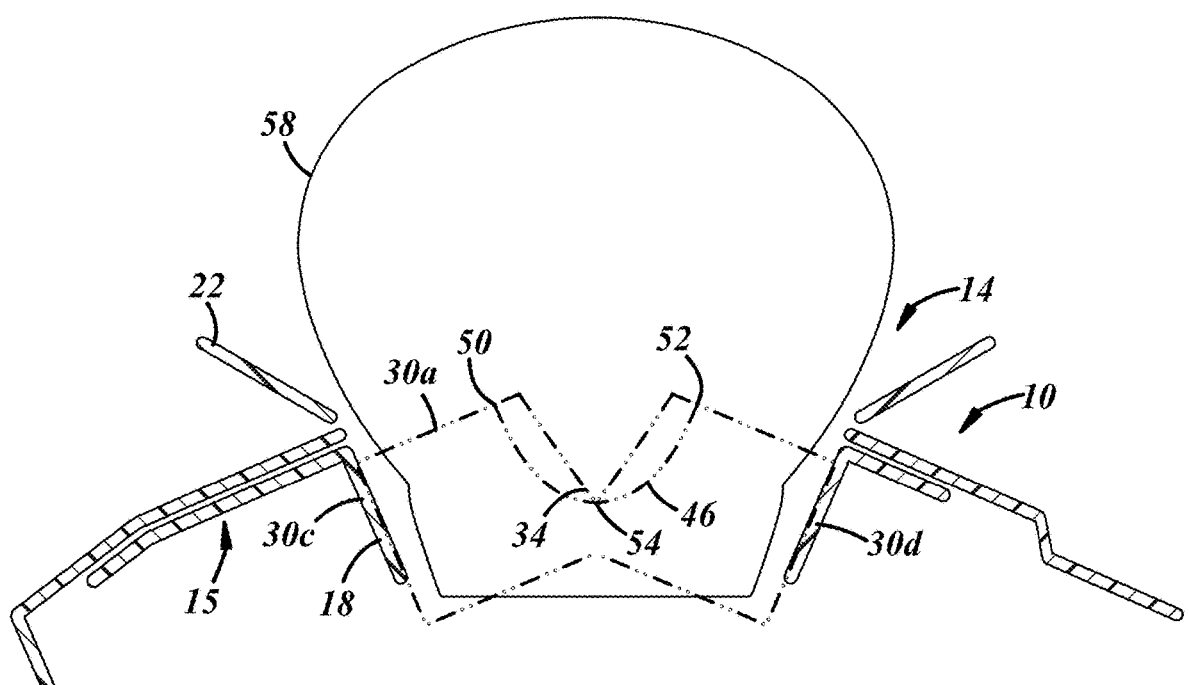
FIG. 7 is the cross-sectional view of FIGS. 5 and 6 illustrating the panel at a later stage of airbag deployment.

FIG. 7 illustrates the airbag 58 fully inflated, with the opposite sides of the chute 15 moved farther apart and with the wall segment 30a split farther along the tear seam 34, down to the second end 54 of the cavity formed by the dual-wall construction. At this point, the original distance W2 between the locations 50, 52 where the inner and outer portions 42, 46 of the dual-wall intersect has increased approximately as much as the width W1 (FIG. 3) of the wall segment 30a. But the presence of the outer wall portion 46 can help limit those increases in W1 and W2. Those increases may be limited by the original distance W2 between the two locations 50, 52 of the outer portion 46 of the wall. In other words, as those locations 50, 52 move apart, the outer portion 46 of the wall segment 30a changes shape. With a curved outer portion 46 as in FIGS. 3 and 4, the curvature may begin to flatten—i.e., the convex shape of the outer portion 46 may become less convex. At some point, the outer portion 46 can be flattened no further and the outer portion serves as a sort of tether holding the opposite sides 30c, 30d together and effectively ending the splitting of the interconnecting wall segment 30a and preserving the integrity of the chute wall 18 and panel 10 as a whole. Of course, the outer portion 46 of the wall segment 30a does not have to perform in exactly this manner to provide benefits. Even if the wall segment 30a continues to split or if the outer portion 46 is never fully elongated, it may still absorb sufficient energy to prevent breakage of the panel 10 outside the airbag door region 14. As noted above, the amount the airbag door region 14 enlarges during airbag deployment can be designed into the chute wall 18 via the width W2. A suitable range for the width W2 is 40-60 mm, or about 40% to 60% of the width of the airbag door region 14, measured in the same direction. A greater width W2 can allow for more expansion of the airbag door region 14, while a lesser width W2 can allow for less expansion of the airbag door region 14. Also, the distance between the inner and outer portions 42, 46 of the dual-wall can affect the amount of enlargement of the airbag door region 14, with a greater distance leading to more enlargement and a lesser distance leading to less enlargement.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle interior panel for use over an airbag and configured to split along a tear seam in an airbag door region of the panel during airbag deployment, the vehicle interior panel comprising:
   a chute located along a back side of the panel for guiding the airbag toward the airbag door region during airbag deployment,
   wherein the chute comprises a wall configured to split at a predetermined location such that opposite sides of the chute move away from each other to enlarge the airbag door region during airbag deployment.

2. The vehicle interior panel of claim 1, wherein the chute further comprises a body, and the wall extends away from a back side of the body and surrounds the airbag door region.

3. The vehicle interior panel of claim 2, wherein the wall meets the body at the predetermined location.

4. The vehicle interior panel of claim 1, wherein the wall surrounds the airbag door region and includes opposite wall segments on the opposite sides of the chute and an additional wall segment interconnecting the opposite wall segments, and wherein the additional wall segment includes the predetermined location and is longer than the opposite wall segments.

5. The vehicle interior panel of claim 1, wherein the predetermined location is a reduced-thickness region of the wall.

6. The vehicle interior panel of claim 5, wherein the reduced-thickness region has a thickness that is 10-40% of a thickness of the wall outside the reduced-thickness region.

7. The vehicle interior panel of claim 1, further comprising a chute tear seam along the wall at the predetermined location.

8. The vehicle interior panel of claim 1, wherein the wall has an inner portion and an outer portion, the inner portion at least partly defining an inner surface of the chute,
   wherein a cavity is defined between the inner portion and the outer portion of the wall, and
   wherein the predetermined location is along the inner portion of the wall.

9. The vehicle interior panel of claim 8, wherein the outer portion of the wall intersects the inner portion of the wall at first and second locations on opposite sides of the predetermined location such that the first and second locations move away from each other during airbag deployment.

10. The vehicle interior panel of claim 8, wherein the outer portion of the wall is curved between the first and second locations at a first end of the cavity, and the outer wall is tapered toward an opposite second end of the cavity.

11. The vehicle interior panel of claim 10, wherein the outer wall has a thickness that is greater at the first end of the cavity than at the second end of the cavity.

12. The vehicle interior panel of claim 10, wherein the first end of the cavity is an open end, and the second end of the cavity is a closed end.

13. The vehicle interior panel of claim 1, wherein the tear seam is an H-shaped tear seam, the panel further comprising two airbag doors having hinge sides on the opposite sides of the chute.

14. The vehicle interior panel of claim 1, wherein the opposite sides of the chute pivot away from each other to enlarge the airbag door region during airbag deployment.

15. The vehicle interior panel of claim 1, wherein the vehicle interior panel is an instrument panel.

\* \* \* \* \*